(12) United States Patent
Pal et al.

(10) Patent No.: US 11,907,252 B2
(45) Date of Patent: Feb. 20, 2024

(54) ON-DEMAND CROSS DATA CENTER DATA REPLICATION FOR MULTI-CLOUD SOFTWARE APPLICATIONS

(71) Applicant: SAP SE, Walldorf (DE)

(72) Inventors: Tanmoy Pal, Bengaluru (IN); Rajesh Hegde, Bengaluru (IN)

(73) Assignee: SAP SE, Walldorf (DE)

( * ) Notice: Subject to any disclaimer, the term of this patent is extended or adjusted under 35 U.S.C. 154(b) by 47 days.

(21) Appl. No.: 17/541,739

(22) Filed: Dec. 3, 2021

(65) Prior Publication Data

US 2023/0177066 A1 Jun. 8, 2023

(51) Int. Cl.
  *G06F 16/27* (2019.01)
  *G06F 16/25* (2019.01)
  *G06F 16/23* (2019.01)
  *G06F 21/60* (2013.01)

(52) U.S. Cl.
  CPC .......... *G06F 16/27* (2019.01); *G06F 16/2358* (2019.01); *G06F 16/256* (2019.01); *G06F 21/604* (2013.01)

(58) Field of Classification Search
  CPC ................................ G06F 16/27; G06F 16/256
  See application file for complete search history.

(56) References Cited

U.S. PATENT DOCUMENTS

| | | | |
|---|---|---|---|
| 2017/0357901 A1* | 12/2017 | La Placa | G06Q 10/00 |
| 2020/0233863 A1* | 7/2020 | King | G06F 16/2458 |
| 2021/0200785 A1* | 7/2021 | Poteet, III | G06F 16/27 |
| 2021/0318998 A1* | 10/2021 | Filip | G06F 16/245 |
| 2022/0148348 A1* | 5/2022 | Jordan | G07C 5/0858 |
| 2022/0414601 A1* | 12/2022 | Shek | G06Q 10/103 |
| 2023/0004401 A1* | 1/2023 | Owen | G06F 9/44505 |

* cited by examiner

*Primary Examiner* — Dangelino N Gortayo
(74) *Attorney, Agent, or Firm* — Mintz Levin Cohn Ferris Glovsky and Popeo, P.C.

(57) ABSTRACT

A method may include detecting one or more trigger events at a first data center hosting a software application having a first customer onboarded at the first data center but not a second data center also hosting the software application. In response to the trigger events, a first data associated with the first customer may be replicated at the second data center to enable a collaboration between the first customer and a second customer of the software application onboarded at the second data center but not the first data center. One or more data replication relevant settings may be applied to prevent a second data associated with the first customer from being replicated at the second data center. Furthermore, the data replication relevant settings may be applied to prevent the first data from being replicated at a third data center. Related systems and computer program products are also provided.

20 Claims, 6 Drawing Sheets

ON-DEMAND CROSS DATA CENTER DATA REPLICATION FOR MULTI-CLOUD SOFTWARE APPLICATIONS

TECHNICAL FIELD

The subject matter described herein relates generally to cloud computing and more specifically to on-demand cross data center data replication for multi-cloud software applications.

BACKGROUND

An enterprise may rely on a suite of enterprise software applications for sourcing, procurement, supply chain management, invoicing, and payment. These enterprise software applications may provide a variety of data processing functionalities including, for example, billing, invoicing, procurement, payroll, time and attendance management, recruiting and onboarding, learning and development, performance and compensation, workforce planning, and/or the like. Examples of enterprise software applications may include enterprise resource planning (ERP) software, customer relationship management (CRM) software, and/or the like. Data associated with multiple enterprise software applications may be stored in a common database in order to enable integration across different enterprise software applications. Moreover, to provide access to multiple end users from different geographic locations, many enterprise software applications may be deployed as a web-based application (e.g., a software-as-a-service (SaaS)) such that the functionalities of the enterprise software applications are available for remote access.

SUMMARY

Systems, methods, and articles of manufacture, including computer program products, are provided for on-demand cross data center data replication. In some example embodiments, there is provided a system that includes at least one processor and at least one memory. The at least one memory may include program code that provides operations when executed by the at least one processor. The operations may include: detecting one or more trigger events at a first data center hosting a software application having a first customer onboarded at the first data center but not a second data center also hosting the software application; and responding to the one or more trigger events by at least replicating, at the second data center, a first data associated with the first customer onboarded the first data center, the replicating of the first data enabling a collaboration between the first customer onboarded at the first data center and a second customer of the software application onboarded at the second data center but not the first data center.

In some variations, one or more features disclosed herein including the following features can optionally be included in any feasible combination. The one or more trigger events may include a creation, an update, and/or a deletion of the first customer.

In some variations, the first data replicated at the second data center may include a profile of the first customer. The replicating of the profile of the first customer at the second data center may render the first customer visible to the second customer onboarded at the second data center.

In some variations, the one or more trigger events may include the first customer sharing the first data with the second customer.

In some variations, the first data may include one or more documents associated with the software application.

In some variations, the operations may further include: applying one or more data replication relevant settings to prevent the first data from being replicated at a third data center.

In some variations, the operations may further include: applying one or more data replication relevant settings to prevent a second data associated with the first customer from being replicated at the second data center.

In some variations, the software application may include an enterprise resource planning (ERP) application, a customer relationship management (CRM) application, a process management application, a process intelligence application, a sales engagement application, a territory and quota management application, an agent performance management (APM) application, a social networking application, a data warehousing application, and/or a logistics collaboration application.

In some variations, the one or more trigger events may be detected by a replication client at the first data center. The replicating of the first data may be performed by a replication service.

In some variations, the one or more trigger events may include an invocation of a replication method associated with the replication client. The replication client may be configured to respond to the invocation of the replication method by calling an application programming interface (API) of the replication service.

In some variations, the calling of the application programming interface (API) may generates a replication request that is inserted into a first queue for publication to an event broker. The event broker may insert the replication request into a second queue for consumption by the second data center.

In another aspect, there is provided a method for on-demand cross data center data replication. The method may include: detecting one or more trigger events at a first data center hosting a software application having a first customer onboarded at the first data center but not a second data center also hosting the software application; and responding to the one or more trigger events by at least replicating, at the second data center, a first data associated with the first customer onboarded the first data center, the replicating of the first data enabling a collaboration between the first customer onboarded at the first data center and a second customer of the software application onboarded at the second data center but not the first data center.

In some variations, one or more features disclosed herein including the following features can optionally be included in any feasible combination. The one or more trigger events may include a creation, an update, and/or a deletion of the first customer.

In some variations, the first data replicated at the second data center may include a profile of the first customer. The replicating of the profile of the first customer at the second data center may render the first customer visible to the second customer onboarded at the second data center.

In some variations, the one or more trigger events may include the first customer sharing the first data with the second customer.

In some variations, the first data may include one or more documents associated with the software application.

In some variations, the method may further include: applying one or more data replication relevant settings to prevent the first data from being replicated at a third data center.

In some variations, the method may further include: applying one or more data replication relevant settings to prevent a second data associated with the first customer from being replicated at the second data center.

In another aspect, there is provided a computer program product including a non-transitory computer readable medium storing instructions. The instructions may cause operations may executed by at least one data processor. The operations may include: detecting one or more trigger events at a first data center hosting a software application having a first customer onboarded at the first data center but not a second data center also hosting the software application; and responding to the one or more trigger events by at least replicating, at the second data center, a first data associated with the first customer onboarded the first data center, the replicating of the first data enabling a collaboration between the first customer onboarded at the first data center and a second customer of the software application onboarded at the second data center but not the first data center.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Enterprise software applications may provide a variety of solutions for sourcing, procurement, supply chain management, invoicing, and payment. To optimize performance, manage cost, and leverage the best qualities of individual cloud providers, many modern enterprise software applications are deployed as multi-cloud solutions across multiple platform-as-a-service (Paas) and/or infrastructure-as-a-service (IaaS) offerings. Multi-cloud solutions may afford customers the flexibility to be onboarded on a region and data center of their choice. However, a first customer onboarded on a first data center may be prevented from collaborating with a second customer onboarded on a second data center because customer details and application data for the first customer and the second customer are not available across multiple data centers. Multidirectional data copy across multiple data centers is costly yet provides inadequate performance.

In some example embodiments, a replication service may be configured to federate data across multiple data centers on an on-demand basis. For example, the replication service may respond to the creation, update, and/or deletion of a customer at a first data center by replicating the customer (e.g., a profile of the customer) at a second data center. Alternatively and/or additionally, the replication service may respond to the sharing of a data object at a first data center by replicating the data object at a second data center. The replicating of the data object may be performed based on one or more data replication relevant settings associated with the data object. For instance, the data object may be replicated at the second data center but not a third data center if the data object lacks the legal clearance and/or security permission for replication at the third data center.

Figure 1:
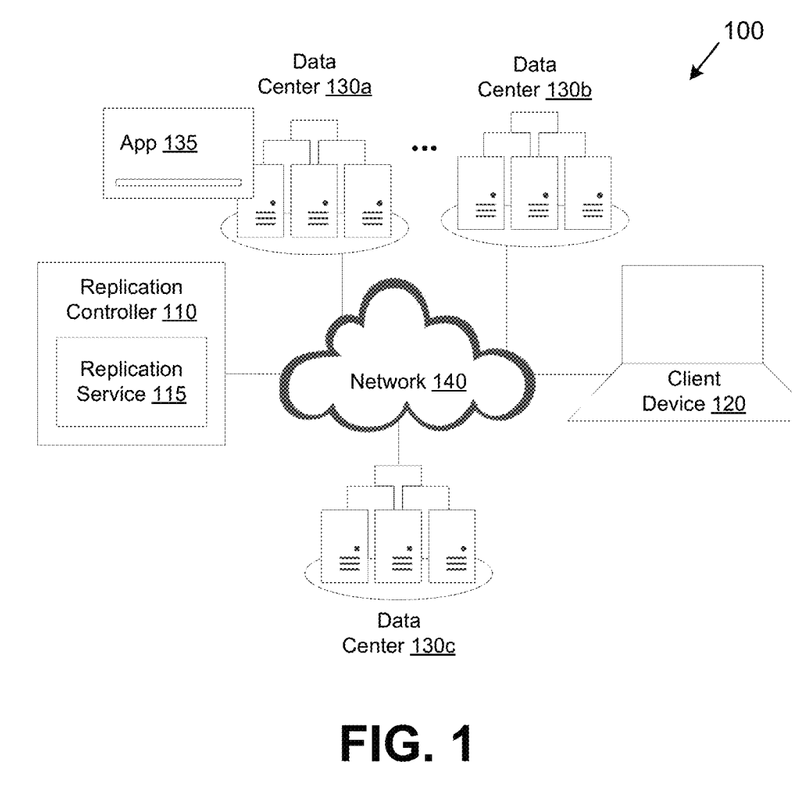
FIG. 1 depicts a system diagram illustrating an example of a cloud computing system, in accordance with some example embodiments.

FIG. 1 depicts a system diagram illustrating an example of a cloud computing system 100, in accordance with some example embodiments. Referring to FIG. 1, the cloud computing system 100 may include a replication controller 110, a client device 120, and one or more data centers 130. As shown in FIG. 1, the replication controller 110, the client device 120, and the one or more data centers 130 may be communicatively coupled via a network 140. The client device 120 may be a processor-based device including, for example, a smartphone, a tablet computer, a wearable apparatus, a virtual assistant, an Internet-of-Things (IoT) appliance, and/or the like. The network 140 may be a wired network and/or a wireless network including, for example, a wide area network (WAN), a local area network (LAN), a virtual local area network (VLAN), a public land mobile network (PLMN), the Internet, and/or the like.

The one or more data centers 130 may include a collection of computational resources including, for example, computer systems, telecommunication systems, storage systems, and/or the like. Moreover, the one or more data centers 130 may be maintained by a same cloud provider or different cloud providers. To optimize performance, manage cost, and leverage the best qualities of individual cloud providers, a software application 135 may be deployed as a multi-cloud solution across multiple platform-as-a-service (Paas) and/or infrastructure-as-a-service (IaaS) offerings. For example, the software application 135 may be a web-based application and/or a cloud-based application hosted at a first data center 120*a* and a second data center 120*b* such that the software application 135 is accessible at the client device 120 through the network 140. The software application 135 may be an enterprise software applications including, for example, an enterprise resource planning (ERP) application, a customer relationship management (CRM) application, a process management application, a process intelligence application, a sales engagement application, a territory and quota management application, an agent performance management (APM) application, a social networking application, a data warehousing application, a logistic collaboration application, and/or the like.

In some example embodiments, the replication controller 110 may provide a replication service 115 configured to federate data across the one or more data centers 130 on an on-demand basis. For example, the replication service 115 may respond to the creation, update, and/or deletion of an object at the first data center 130*a* by replicating the object at the second data center 130*b*. Alternatively and/or additionally, the replication service 115 may respond to the sharing of a data object at the first data center 130*a* by replicating the data object at the second data center 130*b*. It should be appreciated that the replicating of the data object may be subject to one or more data replication relevant settings associated with the data object. For instance, the data object may be replicated at the second data center but not a third data center 130*c* if the data object lacks the legal clearance and/or security permission for replication at the third data center 130*c*.

Figure 2:
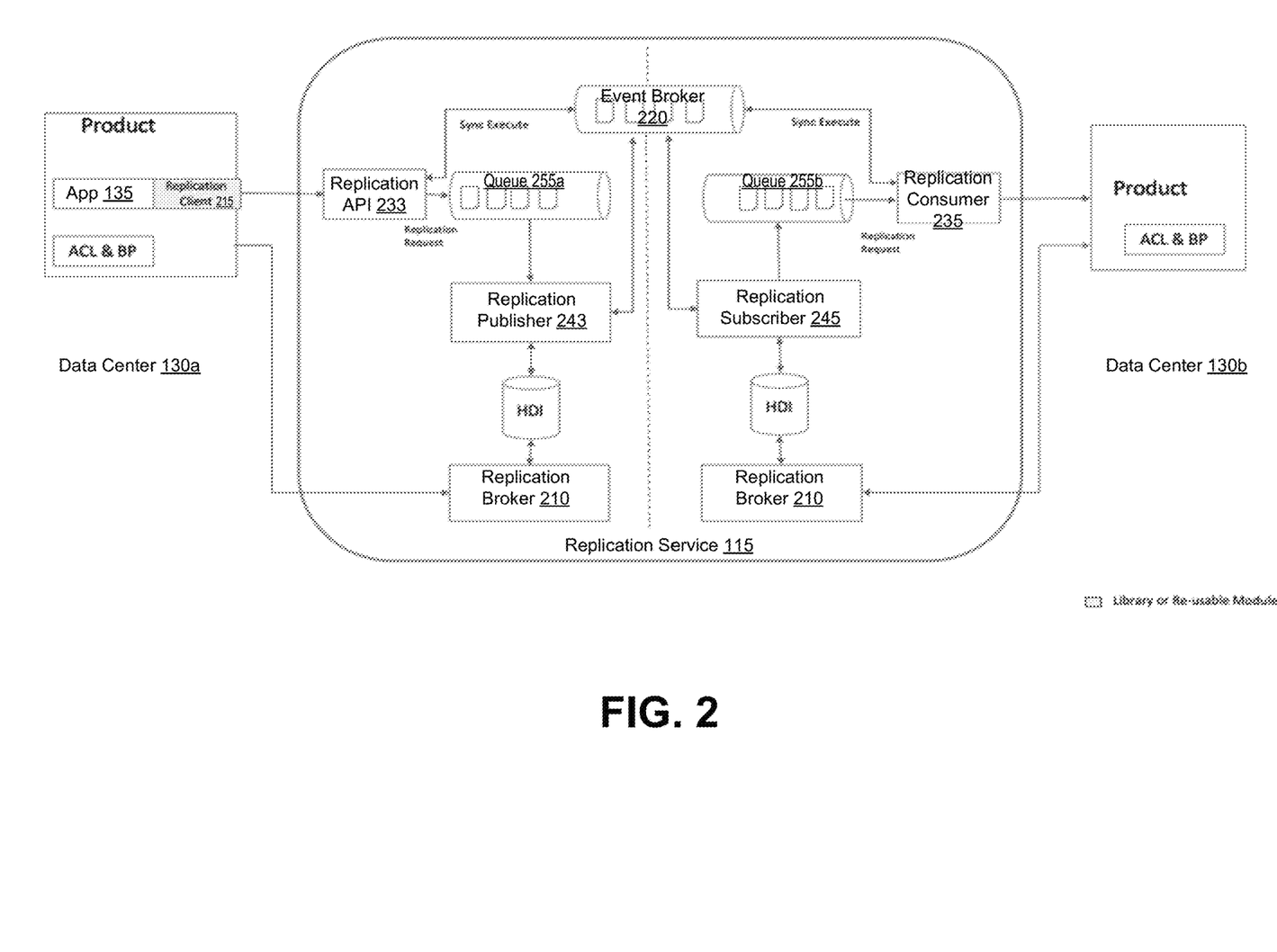
FIG. 2 depicts a schematic diagram illustrating an example of a data federation architecture, in accordance with some example embodiments.

FIG. 2 depicts a schematic diagram illustrating an example of a data federation architecture, in accordance with some example embodiments. In the example shown in FIG. 2, the replication service 115 may be configured to replicate data from the first data center 130*a* to the second data center 130*b*. For example, as shown in FIG. 2, a replication client 215 associated with the software application 135 deployed at the first data center 130*a* may be configured to detect one or more events triggering the replication of data from the first data center 130*a* to the second data center 130*b*. In some example embodiments, the replication client 215 may provide a library and/or a reusable module for the software application 135 to interact with the replication service 115. For example, in some instances, the software application 135 may trigger data replication (e.g., from the first data center 130*a* to the second data center 130*b*) by invoking a replication method associated with the replication client 215 instead of making direct calls to a replication application programming interface (API) 233 of the replication service 115. As shown in FIG. 2, upon detecting the one or more trigger events, the replication client 215 may respond to the invocation of the replication method by calling the replication application programming interface (API) 233 of the replication service 115.

Referring again to FIG. 2, in response to the replication client 215 calling the replication application programming interface (API) 233 of the replication service 115, a corresponding replication request may be inserted into a first queue 255*a*. A replication publisher 243 may subsequently publish the replication request to an event broker 220. As shown in FIG. 2, the event broker 220 may insert the replication request to a second queue 255*b* of a replication subscriber 245, which may further forward the replication request to a replication consumer 235 associated with the second data center 130*b*. The replication consumer 235 may replicate the data from the first data center 130*a* at the second data center 130*b*. A replication broker 210 may coordinate the data replication, for example, through interaction with the replication publisher 243 and the replication subscriber 245. For example, the replication broker 210 may publish a catalog of services and service plans, manage the provisioning and de-provisioning of service instances, and provide connection details and credentials for an application (e.g., the software application 135) to consume the resource.

Multi-cloud solutions in which the software application 130 may be deployed at multiple data centers, such as the first data center 130*a*, the second data center 130*b*, and the third data center 130*c*, may afford customers the flexibility to be onboarded on a region and data center of their choice. However, a first customer onboarded on the first data center 130*a* may be prevented from collaborating with a second customer onboarded on the second data center 130*b* because customer details and application data for the first customer and the second customer are not available across multiple data centers. Multidirectional data copy across multiple data centers may be costly yet provides inadequate performance. As such, in some example embodiments, to enable collaboration between the first customer onboarded at the first data center 130*a* and the second customer onboarded at the second data center 130*b*, the replication service 115 is configured to replicate data from the first data center 130*a* to the second data center 130*b* on an on-demand basis. For example, the replication of data from the first data center 130*a* to the second data center 130*b* may be triggered by one or more events. Moreover, the replication of data from the first data center 130*a* to the second data center 130*b* may be subject to one or more data replication relevant settings including, for example, legal clearances, security permissions, and/or the like.

Figure 3A:
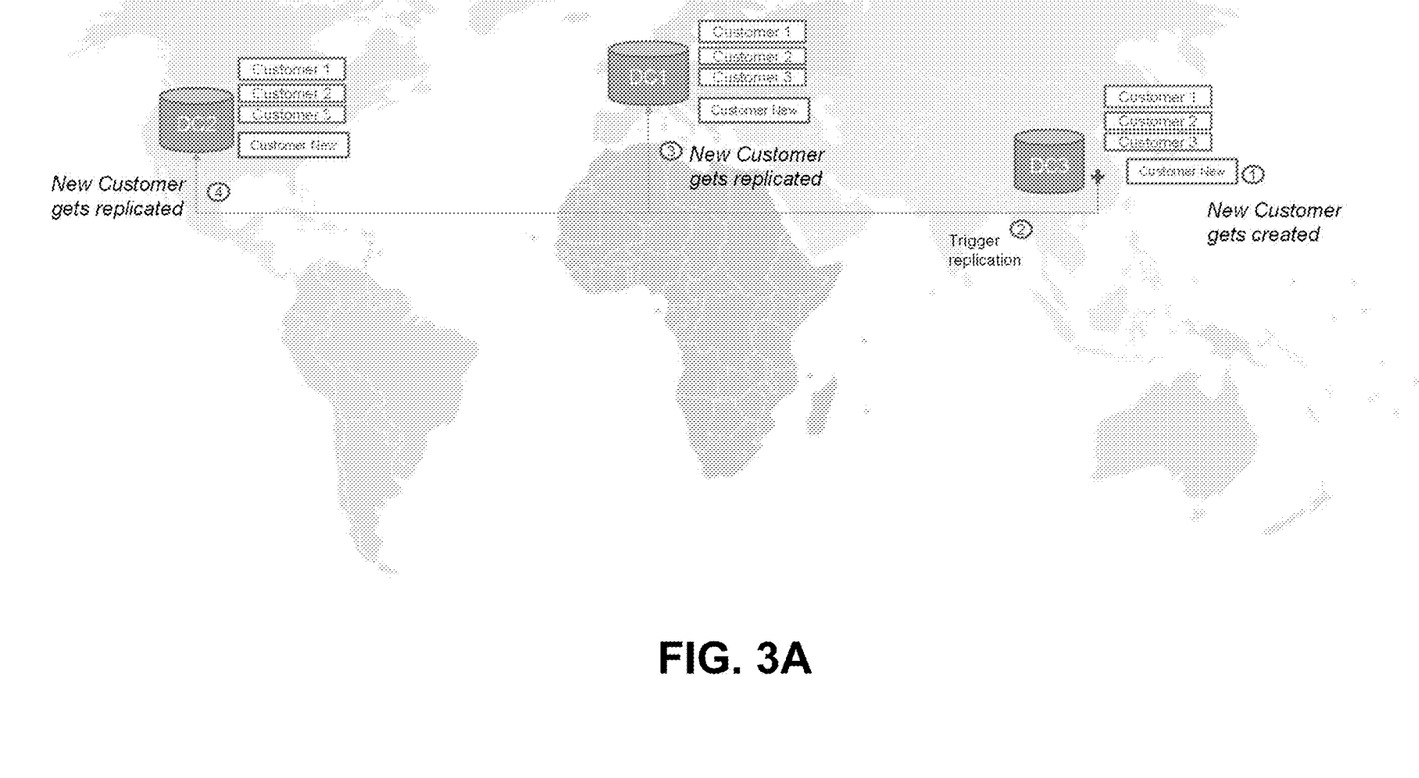
FIG. 3A depicts a schematic diagram illustrating an example of customer replication, in accordance with some example embodiments.

FIG. 3A depicts a schematic diagram illustrating one example of data replication being triggered by an event such as the creation, update, and/or deletion of a customer. In the example shown in FIG. 3A, a new customer (e.g., "BMW CN") may be created at the third data center 130*c* (DS3). The creation of the new customer (e.g., "BMW CN") at the third data center 130*c* (DS3) may trigger the replication of the new customer (e.g., a profile for "BMW CN") at the first data center 130*a* (DS1) and the second data center 130*b* (DS2). This replication may be subjected to one or more configuration settings of the new customer. For example, in some instances, the configuration settings of the new customer may stipulate that the new customer is replicated at the first data center 130*a* (DS1) but not the second data center 130*b* (DS2), in which case the replication service 115 may replicate the profile of the new customer at the first data center 130*a* (DS1) but not the second data center 130*b* (DS2). The replication of the new customer (e.g., the profile for "BMW CN") at the first data center 130*a* (DS1) and/or the second data center 130*b* (DS2) may render the new customer (e.g., "BMW CN") visible to and available for collaboration with the other customers onboarded at the first data center 130*a* (DS1) and/or the second data center 130*b* (DS2) even though the new customer is not onboarded at the first data center 130*a* (DS1) or the second data center 130*b* (DS2).

Figure 3B:
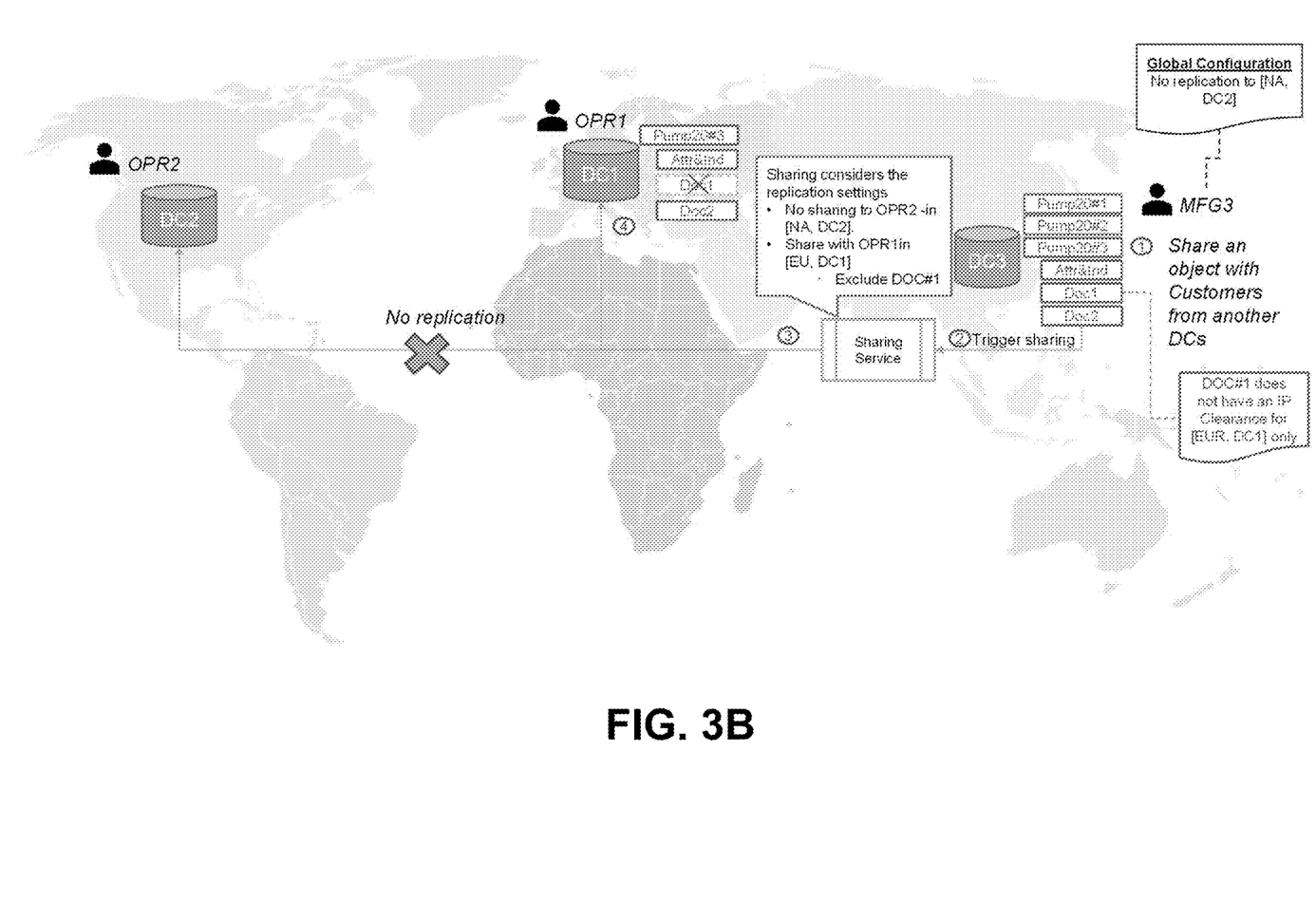
FIG. 3B depicts a schematic diagram illustrating an example of shared content replication, in accordance with some example embodiments.

FIG. 3B depicts a schematic diagram illustrating another example of data replication being triggered by the sharing of a data object. For example, as shown in FIG. 3B, one or more data objects (e.g., assets such as a first document Doc1 and a second document Doc2 associated with the software application 135) from the third data center 130*c* (DS3) may be shared with customers at one or more other data centers. This sharing may be responsive to a user input and/or a sharing pattern selecting the one or more data object for sharing. Accordingly, FIG. 3B shows that the one or more data objects may be shared by being replicated at the first data center 130*a* but not at the second data center 130*b*. This may be due to the replication service 115 may apply one or more data replication relevant settings associated with the data object. In the example shown in FIG. 3B, for instance, the first document Doc1 may lack legal clearance for being replicated at the second data center 130*b* and is therefore not replicated at the first data center 130*a* (DS1). Moreover, the replication service 115 may be configured to limit the data replication to specific data objects and/or data centers. For instance, in the example shown in FIG. 3B, the second document Doc2 is replicated at the first data center 130*a* (DS1) but not at the second data center 130*b* (DS2) at least because the second document Doc2 is not being shared with the second data center 130*b* (DS2).

Figure 4:
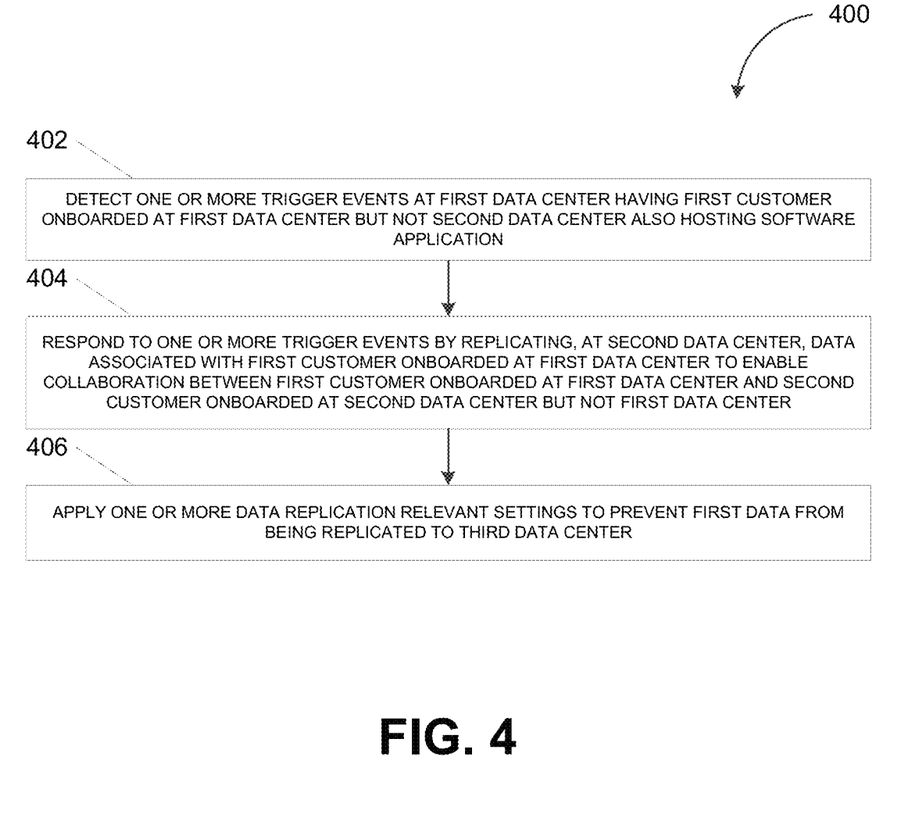
FIG. 4 depicts a flowchart illustrating an example of a process for on demand cross data center data replication, in accordance with some example embodiments.

FIG. 4 depicts a flowchart illustrating an example of a process 400 for on demand cross data center data replication, in accordance with some example embodiments. Referring to FIGS. 1-4, the process 400 may be performed by the replication controller 110, for example, the service 115, to replicate data from the first data center 130*a* to the second data center 130*b*.

At 402, the replication controller 110 may detect one or more trigger events at a first data center hosting a software application having a first customer onboarded at the first data center but not a second data center also hosting the software application. In some example embodiments, the replication controller 110, for example, the replication service 115, may be configured to perform data replication on an on-demand basis. For example, as shown in FIG. 2, the replication client 215 at the first data center 130*a* may detect one or more trigger events including, for example, the creation, update, and/or deletion of a customer (e.g., a customer profile) at the first data center 130*a*. Other examples of trigger events may include the sharing of a data object (e.g., a document object), whether responsive to a user input and/or a sharing pattern selecting the data object for sharing.

At 404, the replication controller 110 may respond to the one or more trigger events by at least replicating data associated with the first customer onboarded the first data center to enable a collaboration between the first customer onboarded at the first data center and a second customer of the software application onboarded at the second data center but not the first data center. For example, as shown in FIG. 2, the replication client 215 may respond to the one or more trigger events by calling the replication application programming interface (API) 233 of the replication service 115 to insert a corresponding replication request into the first queue 255*a* of the replication publisher 243. The replication publisher 243 may publish the replication request to the event broker 220, which may insert the replication request to the second queue 255*b* of the replication subscriber 245. The replication subscriber 243 may further forward the replication request to the replication consumer 235 associated with the second data center 130*b* such that the replication consumer 235 may replicate the data from the first data center 130*a* at the second data center 130*b*.

At 406, the replication controller 110 may apply one or more data replication relevant settings to prevent the first data from being replicated to a third data center. In some example embodiments, the replication of data from the first data center 130*a* to the second data center 130*b* may be subject to one or more data replication relevant settings including, for example, legal clearances, security permissions, and/or the like. Data replication relevant settings may also include customer-specific settings that stipulate, for example, whether the profile of a customer may be replicated at other data centers. Accordingly, in the example shown in FIG. 3B, the replication controller 110, for example, the replication service 115, may apply the one or more data replication relevant settings to prevent a data object (e.g., the first document Doc1) at the third data center 130*c* from being replicated at the second data center 130*b* for which the data object lacks the necessary legal clearance or security permission. Data replication may also exclude data that is not being shared, for example, with other data centers. In the example shown in FIG. 3B, for instance, the replication service 115 may replicate the first document Doc1 but not the second document Doc2 because the second document Doc2 is not being shared.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: detecting one or more trigger events at a first data center hosting a software application having a first customer onboarded at the first data center but not a second data center also hosting the software application; and responding to the one or more trigger events by at least replicating, at the second data center, a first data associated with the first customer onboarded the first data center, the replicating of the first data enabling a collaboration between the first customer onboarded at the first data center and a second customer of the software application onboarded at the second data center but not the first data center.

Example 2: The system of example 1, wherein the one or more trigger events include a creation, an update, and/or a deletion of the first customer.

Example 3: The system of example 2, wherein the first data replicated at the second data center comprises a profile of the first customer.

Example 4: The system of example 3, wherein the replicating of the profile of the first customer at the second data center renders the first customer visible to the second customer onboarded at the second data center.

Example 5: The system of any one of examples 1 to 4, wherein the one or more trigger events include the first customer sharing the first data with the second customer.

Example 6: The system of any one of examples 1 to 5, wherein the first data comprises one or more documents associated with the software application.

Example 7: The system of any one of examples 1 to 6, wherein the operations further comprise: applying one or more data replication relevant settings to prevent the first data from being replicated at a third data center.

Example 8: The system of any one of examples 1 to 7, wherein the operations further comprise: applying one or more data replication relevant settings to prevent a second data associated with the first customer from being replicated at the second data center.

Example 9: The system of any one of examples 1 to 8, wherein the software application comprises an enterprise resource planning (ERP) application, a customer relationship management (CRM) application, a process management application, a process intelligence application, a sales engagement application, a territory and quota management application, an agent performance management (APM) application, a social networking application, a data warehousing application, and/or a logistics collaboration application.

Example 10: The system of any one of examples 1 to 9, wherein the one or more trigger events are detected by a replication client at the first data center, and wherein the replicating of the first data is performed by a replication service.

Example 11: The system of example 10, wherein the one or more trigger events comprises an invocation of a replication method associated with the replication client, and wherein the replication client is configured to respond to the invocation of the replication method by calling an application programming interface (API) of the replication service.

Example 12: The system of example 11, wherein the calling of the application programming interface (API) generates a replication request that is inserted into a first queue for publication to an event broker, and wherein the event broker inserts the replication request into a second queue for consumption by the second data center.

Example 13: A computer-implemented method, comprising: detecting one or more trigger events at a first data center hosting a software application having a first customer onboarded at the first data center but not a second data center also hosting the software application; and responding to the one or more trigger events by at least replicating, at the second data center, a first data associated with the first customer onboarded the first data center, the replicating of the first data enabling a collaboration between the first customer onboarded at the first data center and a second customer of the software application onboarded at the second data center but not the first data center.

Example 14: The method of example 13, wherein the one or more trigger events include a creation, an update, and/or a deletion of the first customer.

Example 15: The method of example 14, wherein the first data replicated at the second data center comprises a profile of the first customer, and wherein the replicating of the profile of the first customer at the second data center renders the first customer visible to the second customer onboarded at the second data center.

Example 16: The method of any one of examples 13 to 15, wherein the one or more trigger events include the first customer sharing the first data with the second customer.

Example 17: The system of any one of examples 13 to 16, wherein the first data comprises one or more documents associated with the software application.

Example 18: The method of any one of examples 13 to 17, further comprising: applying one or more data replication relevant settings to prevent the first data from being replicated at a third data center.

Example 19: The method of any one of examples 13 to 18, further comprising: applying one or more data replication relevant settings to prevent a second data associated with the first customer from being replicated at the second data center.

Example 20: A non-transitory computer readable medium storing instructions, which when executed by at least one data processor, result in operations comprising: detecting one or more trigger events at a first data center hosting a software application having a first customer onboarded at the first data center but not a second data center also hosting the software application; and responding to the one or more trigger events by at least replicating, at the second data center, a first data associated with the first customer onboarded the first data center, the replicating of the first data enabling a collaboration between the first customer onboarded at the first data center and a second customer of the software application onboarded at the second data center but not the first data center.

Figure 5:
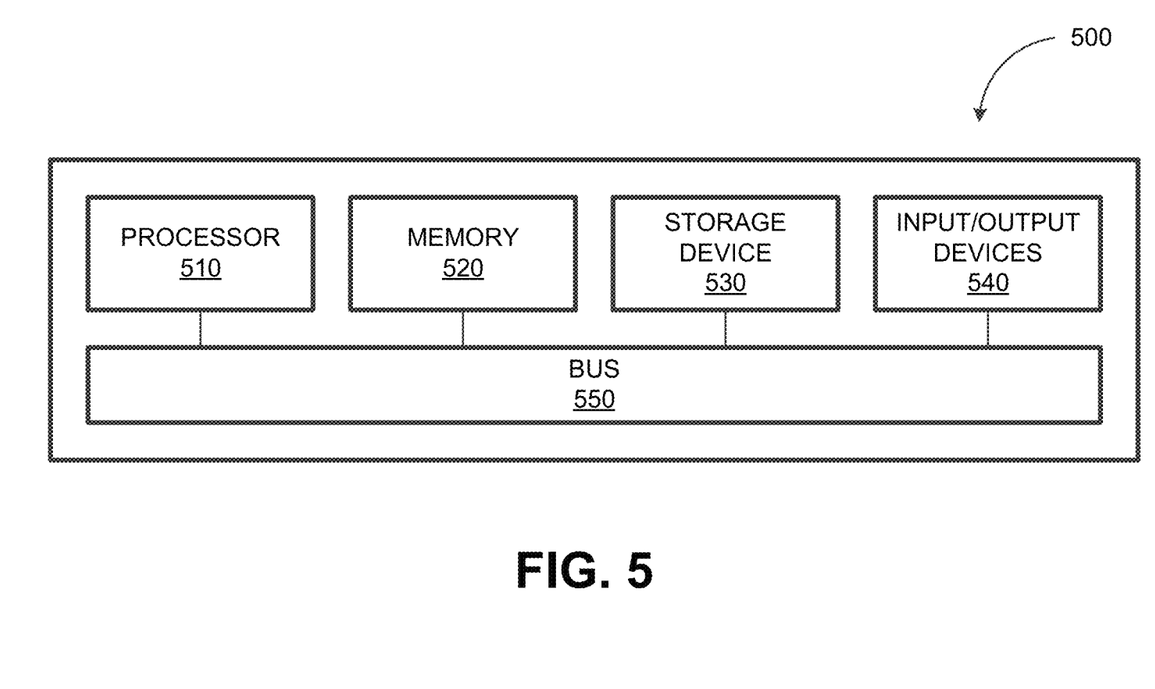
FIG. 5 depicts a block diagram illustrating an example of a computing system, in accordance with some example embodiments; and When practical, similar reference numbers denote similar structures, features, or elements.

FIG. 5 depicts a block diagram illustrating a computing system 500, in accordance with some example embodiments. Referring to FIGS. 1-5, the computing system 500 can be used to implement the replication controller 110 and/or any components therein.

As shown in FIG. 5, the computing system 500 can include a processor 510, a memory 520, a storage device 530, and an input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the replication controller 110. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one processor; and
   at least one memory comprising program code which when executed by the at least one processor provides operations comprising:
   detecting one or more trigger events at a first data center hosting a software application having first customer data of a first customer onboarded at the first data center, without being onboarded at a second data center hosting the software application;
   determining a portion of the first customer data comprising first data, based on replication settings comprising permissions to replicate the portion of the first customer data to a second customer of the software application having second customer data onboarded at the second data center without being onboarded at the first data center; and
   generating, based on the one or more trigger events, a replication, at the second data center, of the first data, the replication of the first data rendering the first data onboarded at the first data center visible to the second customer of the software application onboarded at the second data center for enabling a collaboration between the first customer and the second customer.

2. The system of claim 1, wherein the one or more trigger events comprise a creation, an update, and/or a deletion of the first customer.

3. The system of claim 2, wherein the first data replicated at the second data center comprises a profile of the first customer.

4. The system of claim 3, wherein rendering the first customer data visible to the second customer data onboarded at the second data center comprises providing connection details of the first customer data.

5. The system of claim 1, wherein the one or more trigger events comprise sharing the first data with the second customer.

6. The system of claim 1, wherein the first data comprises one or more documents associated with the software application.

7. The system of claim 1, wherein the operations further comprise:
applying one or more data replication relevant settings to prevent the first data from being replicated at a third data center.

8. The system of claim 1, wherein the operations further comprise:
applying one or more data replication relevant settings to prevent a second data associated with the first customer from being replicated at the second data center.

9. The system of claim 1, wherein the software application comprises an enterprise resource planning (ERP) application, a customer relationship management (CRM) application, a process management application, a process intelligence application, a sales engagement application, a territory and quota management application, an agent performance management (APM) application, a social networking application, a data warehousing application, and/or a logistics collaboration application.

10. The system of claim 1, wherein the one or more trigger events are detected by a replication client at the first data center, and wherein the replication of the first data is performed by a replication service.

11. The system of claim 10, wherein the one or more trigger events comprises an invocation of a replication method associated with the replication client, and wherein the replication client is configured to respond to the invocation of the replication method by calling an application programming interface (API) of the replication service.

12. The system of claim 11, wherein the calling of the application programming interface (API) generates a replication request that is inserted into a first queue for publication to an event broker, and wherein the event broker inserts the replication request into a second queue for consumption by the second data center.

13. A computer-implemented method, comprising:
detecting one or more trigger events at a first data center hosting a software application having first customer data of a first customer onboarded at the first data center, without being onboarded at a second data center hosting the software application;
determining a portion of the first customer data comprising first data, based on replication settings comprising permissions to replicate the portion of the first customer data to a second customer of the software application having second customer data onboarded at the second data center without being onboarded at the first data center; and
generating, based on the one or more trigger events, a replication, at the second data center, of the first data, the replication of the first data rendering the first data onboarded at the first data center visible to the second customer of the software application onboarded at the second data center for enabling a collaboration between the first customer and the second customer.

14. The method of claim 13, wherein the one or more trigger events comprise a creation, an update, and/or a deletion of the first customer.

15. The method of claim 14, wherein the first data replicated at the second data center comprises a profile of the first customer, and wherein rendering the first customer data visible to the second customer data onboarded at the second data center comprises providing connection details of the first customer data.

16. The method of claim 13, wherein the one or more trigger events comprise the first customer sharing the first data with the second customer.

17. The method of claim 13, wherein the first data comprises one or more documents associated with the software application.

18. The method of claim 13, further comprising:
applying one or more data replication relevant settings to prevent the first data from being replicated at a third data center.

19. The method of claim 13, further comprising:
applying one or more data replication relevant settings to prevent a second data associated with the first customer from being replicated at the second data center.

20. A non-transitory computer readable medium storing instructions, which when executed by at least one data processor, result in operations comprising:
detecting one or more trigger events at a first data center hosting a software application having first customer data of a first customer onboarded at the first data center, without being onboarded at a second data center hosting the software application;
determining a portion of the first customer data comprising first data, based on replication settings comprising permissions to replicate the portion of the first customer data to a second customer of the software application having second customer data onboarded at the second data center without being onboarded at the first data center; and
generating, based on the one or more trigger events, a replication, at the second data center, of the first data, the replication of the first data rendering the first data onboarded at the first data center visible to the second customer of the software application onboarded at the second data center for enabling a collaboration between the first customer and the second customer.

* * * * *